Patented Apr. 24, 1951

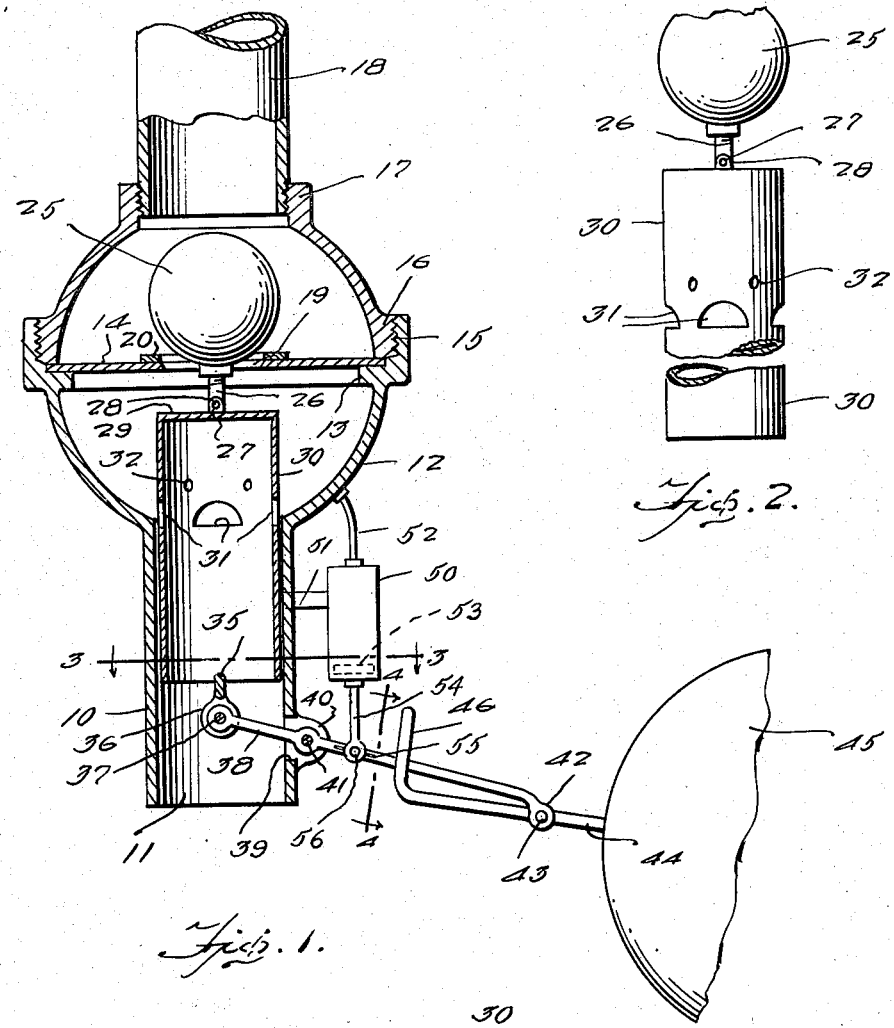

2,550,313

UNITED STATES PATENT OFFICE 2,550,313

FLOAT VALVE

Wesley L. Tucker, Shandon, Calif.

Application June 4, 1946, Serial No. 674,208

3 Claims. (Cl. 137—104)

This invention relates to a float valve.

A primary object of the invention is the provision of an improved float valve characterized by means precluding bobbing of the float, and consequently the valve during operation thereof.

An additional object of the invention is the provision of a valve adapted to operate smoothly and with gradually decreasing closing velocity when operated under relatively high water pressure.

A further object of the invention is the provision of a float valve which is relatively smooth in operation, and wherein sudden movement of the valve to either open or closed position in operation is precluded, both the opening and closing movements of the valve being gradual.

A further object of the invention is the provision of such a device which is sturdy and durable in construction, reliable and efficient in operation, and relatively simple and inexpensive to manufacture, assemble and utilize.

Other objects will in part be obvious and in part be pointed out as the description of the invention proceeds, and shown in the accompanying drawing wherein there is disclosed a preferred embodiment of this inventive concept.

In the drawing:

Figure 1 is a longitudinal vertical sectional view, taken substantially through the center line of one form of valve embodying features of the instant invention.

Figure 2 is an elevational view, partially broken away, of a portion of the operating mechanism.

Figure 3 is a sectional view taken substantially along the line 3—3 of Figure 1, as viewed in the direction indicated by the arrows.

Figure 4 is a sectional view taken substantially along the line 4—4 of Figure 1, as viewed in the direction indicated by the arrows.

Similar reference characters refer to similar parts throughout the several views of the drawing.

Referring now to the drawings, the device of the instant invention comprises a sleeve 10 open at its lower extremity, as at 11, and terminating in a cup-shaped member 12 at its upper end, the member 12 being provided with an interiorly positioned peripheral flange 13 serving as a rest for a valve seat member 14, and having an upstanding peripheral interiorly threaded flange 15. The threads of the flange 15 are adapted to be engaged by corresponding exterior peripheral threads on the periphery of a cup-shaped member 16, which terminates in a threaded flange 17 adapted to be engaged by the threaded extremity of a pipe 18 leading to a source of water supply. Thus, it will be seen that the engagement of the members 12 and 16 serves to seat the valve seat member 14 firmly on the flange 13.

The valve seat 14 is provided with a centrally positioned aperture 19 and surrounded with a packing washer 20, which serves as a fluid-tight seal when the valve is in closed position.

The valve itself is comprised of a spherical member 25 positioned above the aperture 19, secured to a valve stem 26, which is pivotally mounted, as on a pivot 27, secured to lugs 28 extending upwardly from the top 29 of a sleeve 30, which extends downwardly into the tubular member 10.

The sleeve 30 is provided with a plurality of aligned relatively large openings 31 adapted, when the valve is open, to extend out of the tubular member 10 into the cup-shaped member 12, permitting a relatively fast flow of fluid therethrough, and adapted, when the valve closes, to descend into the sleeve 10. Additional smaller apertures 32 serve as bleeds when the valve is closed, permitting the passage of water out of the chamber interiorly of cup 12, but at a relatively slow speed.

As best shown in Figures 1 and 3, the lower portion of the sleeve 30 is provided with a transversely extending bar 35, from which depends a lug 36, to which is pivotally secured, as on a pivot 37, the extremity of a lever 38.

The lever 38 extends outwardly through an aperture 39 in the side of the sleeve 10, and is pivotally secured between protruding lugs 40, as on a pivot pin 41. The outer end of the lever 38 is bifurcated, and terminates in lugs 42 to which is pivotally connected, as by a pivot 43, an arm 44, the outer extremity of which is attached to a float 45. The inner extremity of the arm 44 terminates in an upwardly extending portion 46, provided with an eye 47, adapted to surround the extending portion of the lever 38 exteriorly of the sleeve 10.

Means are provided for precluding too rapid upward or downward movement of the float in the event of waves or ripples on the surface of the tank, such as might occasion jerks or jolts in the mechanism.

Such means take the form of a dash pot 50, mounted on a supporting bracket 51 extending outwardly from the side of the sleeve 10. A water line 52 communicates with the top of the dash pot from a suitable aperture in the cup 12. A piston 53 of conventional design is positioned within the cylindrical dash pot 50, and connected, as by a piston rod 54, to a pivot 56, movable in a slotted aperture 55 in lever 38 exteriorly of the sleeve 10.

From the foregoing, the operation of the device should now be readily understandable. When the water level in the tank containing the float 45 is decreased, the float drops, and the lower portion of the eye 47 through its abutment with the lever 38 and the weight of the float 45 occasions rotation of the lever 38 about the pivot 41 to shift the sleeve 30 upwardly, simultaneously moving the ball valve 25 from its associated seat. This permits the flow of water through the inlet 18 and the valve 19, and through the apertures 31 and thence outwardly of the pipe or sleeve 11 to refill the tank. As the level of fluid in the tank rises, the float 45 will correspondingly rise, and through the abutment of the upper portion of the eye 47 against the lever 38 cause a gradual relatively slow downward movement of the member 30 until the apertures 31 are within the sleeve 11. Simultaneously, the ball valve 25 will move toward the seat reducing the flow of water therethrough. Water will be permitted to flow through the apertures 32, even after the apertures 31 have been substantially closed, and the relatively decreased flow will continue to increase the water level in the tank until the valve 25 is firmly seated on the valve seat 19, at which time flow will stop. Obviously, the piston 53 and the cylindrical dash pot 50 will serve to preclude too rapid movement of the float 45 and its associated lever, since the piston must at all times act against fluid pressure within the sleeve.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A valve comprising a vertical sleeve having an open lower end, an enlarged diameter hollow housing on the upper end of said sleeve and communicating with the upper end thereof, a valve seat supported across the interior of said housing above said sleeve and with its opening aligned with the upper end of said sleeve, a valve positioned in said housing above said valve seat arranged to close said valve seat opening when depressed, a tube slidable in said sleeve, the upper end of said tube being closed and its lower end open, means depending from said valve through said valve seat opening flexibly connecting said valve to the upper end of said tube, the sidewall of said tube being formed with relatively large ports spaced downwardly from the upper end of said tube, said ports being positioned to have communication with the interior of said housing while said tube and said valve are in their extreme elevated positions, whereby liquid can flow downwardly through said housing through said valve seat opening, said tube ports, and the interior of said tube, said ports further being positioned to be occluded by the sidewall of said sleeve in the extreme depressed position of said tube wherein said valve is in closing relation to said valve seat opening, and means for elevating and depressing said tube.

2. A valve comprising a vertical sleeve having an open lower end, an enlarged diameter hollow housing on the upper end of said sleeve and communicating with the upper end thereof, a valve seat supported across the interior of said housing above said sleeve and with its opening aligned with the upper end of said sleeve, a valve positioned in said housing above said valve seat arranged to close said valve seat opening when depressed, a tube slidable in said sleeve, the upper end of said tube being closed and its lower end open, means depending from said valve through said valve seat opening flexibly connecting said valve to the upper end of said tube, the sidewall of said tube being formed with relatively large ports spaced downwardly from the upper end of said tube, said ports being positioned to have communication with the interior of said housing while said tube and said valve are in their extreme elevated positions, whereby liquid can flow downwardly through said housing through said valve seat opening, said tube ports, and the interior of said tube, said ports further being positioned to be occluded by the sidewall of said sleeve in the extreme depressed position of said tube wherein said valve is in closing relation to said valve seat opening, and means for elevating and depressing said tube, the sidewall of said tube being further formed with bleeder ports smaller than said ports and located between said ports and the closed upper end of said tube, said bleeder ports being positioned to be in communication with the interior of said housing while said sleeve is in a partially depressed position in which said ports are occluded by said sleeve, and said valve is still partly unseated, whereby a restricted flow of liquid from said housing into said tube is obtained which induces a slowed movement of said ball valve and said tube to extreme depressed closed position.

3. A valve comprising a vertical sleeve having an open lower end, an enlarged diameter globular housing on and communicating with its upper end, a partition across said globular housing intermediate its upper and lower ends formed with a central valve seat opening, liquid inlet means on said housing above said partition, a ball valve positioned in said housing above said partition and arranged to close said valve seat opening when depressed, a tube slidable in said sleeve having a closed upper end and an open lower end, a flexible connection extending through said valve seat opening between and operatively connecting the closed upper end of said tube and said ball valve, the sidewall of said tube being formed with ports spaced downwardly from the closed upper end of said tube and positioned to be occluded by said sleeve in a depressed position of said tube and to provide communication between the interior of said housing and the interior of said sleeve through said sleeve when said tube and said ball valve are in elevated positions, and means connected to said tube for elevating and depressing said tube and said ball valve.

WESLEY L. TUCKER.

REFERENCES CITED

The following references are of record in the file of this patent:

UNITED STATES PATENTS

| Number | Name | Date |
|---|---|---|
| 505,272 | Kelly | Sept. 19, 1893 |
| 571,168 | Mott | Nov. 10, 1896 |
| 608,342 | McElroy | Aug. 2, 1898 |
| 618,438 | Ryan | Jan. 31, 1899 |
| 686,335 | Rawe | Nov. 12, 1901 |
| 737,446 | McCarthy | Aug. 25, 1903 |
| 977,723 | Field | Dec. 6, 1910 |
| 1,266,637 | Snyder | May 21, 1918 |
| 1,359,593 | Hardt | Nov. 23, 1920 |
| 1,588,645 | Barrett | June 15, 1926 |
| 1,920,062 | Casani | July 25, 1933 |